(12) United States Patent
Betts (10) Patent No.: US 10,212,973 B2
(45) Date of Patent: Feb. 26, 2019

(54) QUICK ADJUST CORD LOCK

(71) Applicant: Catherine Anne Betts, Piedmont, CA (US)

(72) Inventor: Catherine Anne Betts, Piedmont, CA (US)

( * ) Notice: Subject to any disclaimer, the term of this patent is extended or adjusted under 35 U.S.C. 154(b) by 309 days.

(21) Appl. No.: 15/078,322

(22) Filed: Mar. 23, 2016

(65) Prior Publication Data

US 2017/0273367 A1 Sep. 28, 2017

(51) Int. Cl.
  *A41C 3/12* (2006.01)
  *A45C 13/10* (2006.01)
  *A41F 1/00* (2006.01)
  *A41C 3/00* (2006.01)

(52) U.S. Cl.
  CPC ............... *A41C 3/12* (2013.01); *A41F 1/006* (2013.01); *A45C 13/10* (2013.01); *A41C 3/0028* (2013.01); *A41C 3/0057* (2013.01)

(58) Field of Classification Search
  CPC ... A45C 13/1046; A45C 11/005; A45C 13/10; A41C 3/0057; A41C 3/0028; A41F 1/006; A41F 1/04; F16G 11/14; F16G 11/101; Y10T 24/3713; Y10T 24/3716; Y10T 24/3718; Y10T 24/39; Y10T 24/3936; Y10T 24/3969; Y10T 24/3973; Y10T 24/3984; Y10T 24/3987; Y10T 24/3991; Y10T 24/3996; Y10T 24/3703; Y10T 24/3708; Y10T 24/15; A61B 17/0487; A43C 7/08
  USPC ...................... 24/115 G, 712.1, 712.3, 712.5
  See application file for complete search history.

(56) References Cited

U.S. PATENT DOCUMENTS

| | | |
|---|---|---|
| 1,164,642 A | 12/1915 | Guinzburg |
| 1,254,043 A | 1/1918 | James |
| 1,466,598 A | 8/1923 | Panes |
| 1,587,672 A | 6/1926 | Nightingale |
| 2,180,180 A | 11/1939 | Versoy |
| 2,590,915 A | 4/1952 | Allison |
| 2,634,418 A | 4/1953 | Desrochers |
| 2,638,596 A | 5/1953 | Fridolph |
| 2,678,446 A | 5/1954 | Fellner |
| 2,733,445 A | 2/1956 | Champagne |
| 2,867,216 A | 1/1959 | Champagne et al. |
| 2,882,905 A | 4/1959 | Barg |
| 4,031,900 A | 6/1977 | Guidoni |

(Continued)

FOREIGN PATENT DOCUMENTS

| | | |
|---|---|---|
| EP | 2548461 | 9/1999 |
| EP | 1536705 | 6/2005 |

(Continued)

*Primary Examiner* — Jack W Lavinder
(74) *Attorney, Agent, or Firm* — K&L Gates LLP (57) ABSTRACT

The present disclosure is directed to various embodiments of a quick adjust cord lock. The cord lock includes a base portion and a cap portion. The base portion includes a base outer protrusion and a base inner protrusion. The cap portion includes a cap outer protrusion and a cap inner protrusion. The base inner protrusion has a plurality of holes configured to receive a first cord and a second cord. A first pressure is applied to the first cord and the second cord between the cap outer protrusion and the base outer protrusion. A second pressure is applied to the first cord and the second cord by the cap inner protrusion.

19 Claims, 6 Drawing Sheets

(56) References Cited

U.S. PATENT DOCUMENTS

| | | | |
|---|---|---|---|
| 4,294,257 A | 10/1981 | Rennhofer | |
| 4,797,954 A | 1/1989 | Williams | |
| 5,011,452 A | 4/1991 | Kelly | |
| 5,208,950 A * | 5/1993 | Merritt | F16G 11/14 24/115 H |
| 5,263,202 A | 11/1993 | Siberell | |
| 5,378,192 A | 1/1995 | Darmante | |
| 5,903,959 A * | 5/1999 | Leonardi | A43C 7/08 24/115 G |
| 6,068,538 A | 5/2000 | Alleyne | |
| 6,165,045 A | 12/2000 | Miller et al. | |
| 6,749,579 B1 | 6/2004 | Schroder | |
| 7,094,251 B2 * | 8/2006 | Bonutti | A61B 17/0487 24/115 R |
| 7,435,155 B2 | 10/2008 | Reinisch et al. | |
| 7,588,479 B2 | 9/2009 | Falla | |
| 7,753,759 B2 | 7/2010 | Pintor et al. | |
| 7,938,711 B1 | 5/2011 | Johnston | |
| 8,128,457 B2 | 3/2012 | Reinisch et al. | |
| 8,177,602 B1 | 5/2012 | Kaytes | |
| 8,465,341 B2 | 6/2013 | Shashy | |
| 9,408,420 B2 | 8/2016 | Betts | |
| 2002/0029407 A1 | 3/2002 | Blechman | |
| 2004/0044366 A1 * | 3/2004 | Bonutti | A61B 17/0487 606/232 |
| 2005/0034205 A1 | 2/2005 | Green | |
| 2007/0169247 A1 | 7/2007 | Mordecai | |
| 2008/0052092 A1 | 2/2008 | Cleary | |
| 2011/0104985 A1 | 5/2011 | Linder et al. | |
| 2011/0117818 A1 | 5/2011 | Barnard | |
| 2011/0275276 A1 | 11/2011 | Shashy | |
| 2011/0275277 A1 | 11/2011 | Martins-Crawbuck et al. | |
| 2012/0171930 A1 | 7/2012 | Kaufman | |
| 2012/0244782 A1 | 9/2012 | Pundyk | |
| 2015/0079876 A1 | 3/2015 | Betts | |

FOREIGN PATENT DOCUMENTS

| | | |
|---|---|---|
| EP | 0941674 | 1/2013 |
| WO | 2004002362 | 1/2004 |
| WO | 2012141768 | 10/2012 |

* cited by examiner

QUICK ADJUST CORD LOCK

BACKGROUND

Flexible materials such as fabric, canvas, plastics, etc. are useful because of their form fitting ability. Items of various shapes and sizes may be covered in flexible materials in a number of ways. For example, various shaped objects can be covered and transported via flexible materials (e.g., a canvas bag). As the size and shape of objects differ, flexible material offers wider scope of application, when compared to a more rigid option (e.g., a plastic box). However, though use of flexible materials may provide for improved form-fitting characteristics (e.g., less unused space during transportation), additional adjustment of flexible materials is often limited (e.g., zippers) or non-existent.

Clothing is a particular example of a typical application of flexible materials. Humans vary in size and shapes, yet despite various differences, one thing remains a constant: proper fit is essential. Clothing includes a number of various dimensions to fit humans. Due to the wide variation in shapes and sizes of people, many times finding properly fitting/comfortable clothing can be very difficult. Additionally, providing clothing in standard sizes may not suit every person's needs. A need therefore exists for clothing which is adjustable in various ways, to suit various sizes and shapes of people.

Further, different physical activities may require different dimensioning in clothing. For example, soccer, running, jumping, dancing, boxing, or horseback riding require a relatively higher level or degree of fit. Other activities such as shopping, lounging, hiking, meditating, yoga, bicycling, or gardening require a lower level or degree of fit. A need therefore exists for clothing which may be adjustable to suit various sports and activities. As people seamlessly transition throughout the day from professional activities, to leisure activities, to sporting activities, changing clothes can be a hassle. Thus quick and easy adjustment of clothing, without requiring removal, is ideal.

SUMMARY

The present disclosure is directed to various embodiments of a quick adjust cord lock. The cord lock includes a base portion and a cap portion. The base portion includes a base outer protrusion, having a first height, and a base inner protrusion, having a second height. The cap portion includes a cap outer protrusion, having a third height, and a cap inner protrusion, having a fourth height. The base inner protrusion has a plurality of holes configured to receive a first cord and a second cord. A first pressure is applied to the first cord and the second cord between the cap outer protrusion and the base outer protrusion. A second pressure is applied to the first cord and the second cord by the cap inner protrusion.

Enabling an adjustable a cord lock provides a wearer of a garment (e.g., a sports bra) to adjust and ensure proper tensioning of the cord and related cord components (e.g., a corset mechanism). The cord lock may be tensioned to any degree desired (e.g., breast control may be adjusted to vary by activity). Moreover, the cord lock may be adjusted quickly with minimal access and without bra removal.

Additional features and advantages are described herein, and will be apparent from the following Detailed Description and the figures.

DETAILED DESCRIPTION

Figure 1:
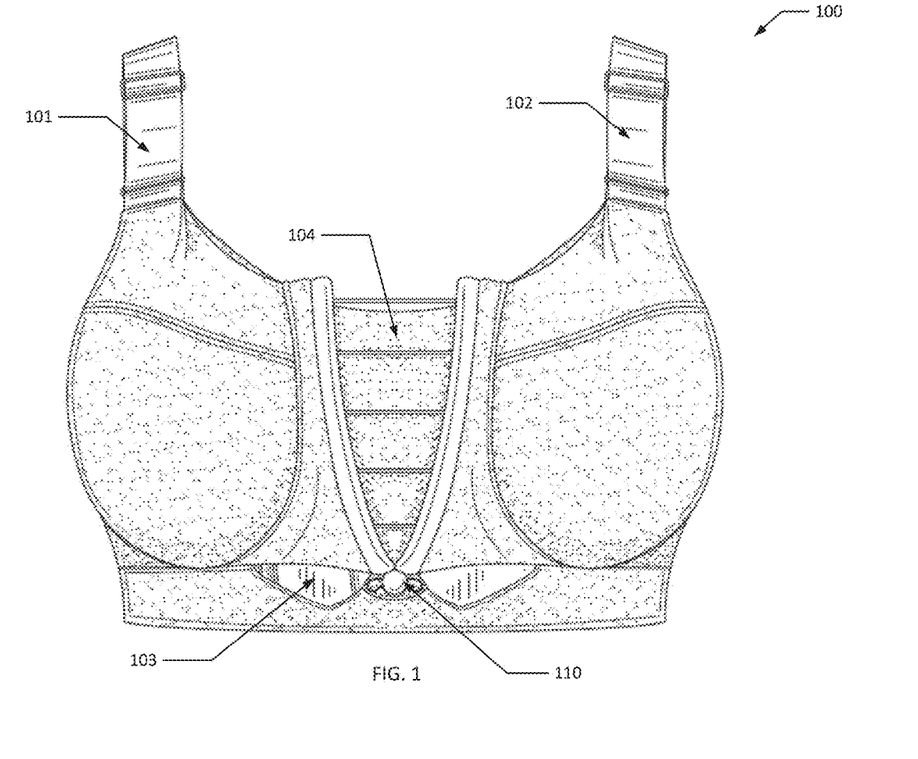
FIG. 1 illustrates a front view of a sports bra and a quick adjust cord lock.

Referring now more specifically to the figures, FIG. 1 illustrates a front view of a sports bra and a quick adjust cord lock. The sports bra 100 includes a plurality of shoulder straps including a first shoulder strap 101 and a second shoulder strap 102. In an example embodiment, each of the first shoulder strap 101 and the second shoulder strap 102 include adjustment mechanisms, which may be positioned at the front (e.g., the breast region) of a user. The sports bra 100 further includes a bottom chest band 103. In an example embodiment, the bottom chest band 103 is one continuous chest band extending about the perimeter of the sports bra 100. In an example embodiment, the chest band 103 includes at least one adjustment mechanism, which may be positioned at the front of the user. The sports bra 100 further includes an adjustable corset mechanism 104. In an example embodiment, the adjustable corset mechanism 104 includes a cord which may be in a laced configuration in the cleavage area (e.g., between the breasts) of the user. The adjustable corset mechanism 104 may further include a cord lock 110.

While, in an example embodiment, the cord lock 110 may be implemented for use with a corset mechanism 104 on a sports bra 100, the cord lock 110 is in no way limited to this application of use. For example, cord lock 110 may be used in other garments (e.g., coats, shirts, pants, shoes, hats, gloves, etc.) and placed in other locations on garments (e.g., ankle, waist, crotch, armpit, chest, neck, arm, wrist, etc.).

In an example embodiment, the cord lock 110 may replace the typical shoelace configuration on a shoe. Through implementation of the cord lock 110, the user may quickly tighten and loosen shoes, based on the type of activity performed. For example, a user may desire looser shoes when going on a casual walk. Likewise, for example, a user may desire tighter shoes when going on a run. Implementation of the cord lock 110 allows for varied activities (e.g., running and walking) with the same apparel (e.g., the same pair of shoes). Additionally, the cord lock 110 may improve user accessibility. For example, some users may have disabilities (e.g., arthritis) that make simple tasks, such as tying shoes, extremely difficult if not impossible. Implementation of the cord lock 110 on garments, such as shoes, remedies this difficulty by providing users with a quick and easy way to adjust garments, such as shoes, to proper tension.

In other example embodiments, cord lock 110 may be used in non-garment or non-apparel type applications. For example, cord lock 110 may be used with storage bags, containers, and other devices that require opening and closing. Likewise, for example, cord lock 110 may be used for organization (e.g., organizing electrical cords, personal electronics chargers, industrial power supplies, etc.). In sum, the cord lock 110 may be universally used in a number of ways and applications, wherever quick adjustment may be required.

Figure 2A:
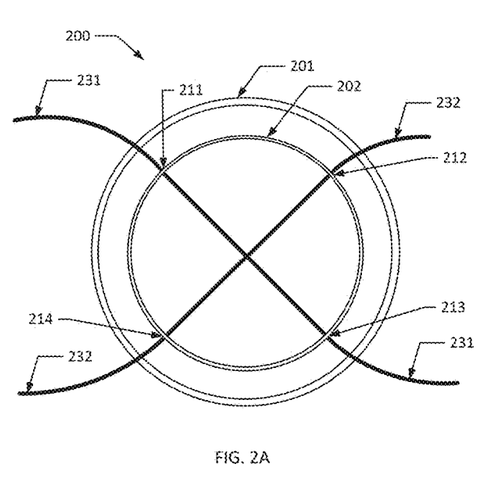
FIGS. 2A-2B illustrate a front view of the quick adjust cord lock including a base portion and a cap portion.
Figure 2B:
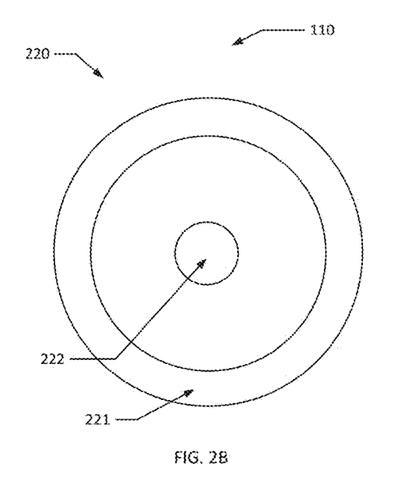

FIGS. 2A-2B illustrate a front view of the quick adjust cord lock 110 including a base portion 200 and a cap portion 220. More particularly, FIG. 2A illustrates a front view of the base portion 200. The base portion 200 includes a base outer protrusion 201. The base outer protrusion 201 has a first height. The base portion 200 further includes a base inner protrusion 202. The base inner protrusion 202 has a second height. In an example embodiment, the second height is greater than the first height. In an example embodiment, the base portion 200 may be affixed to a garment (e.g., sports bra) or other object (e.g., storage bag). In an alternate example embodiment, the cap portion 220 may be affixed to a garment or another object. In another alternate example embodiment, the base portion 200 and the cap portion 220 are permanently engaged with one another in both locked and unlocked configurations, such that both the base portion 200 and the cap portion 220 are affixed to a garment or another object. In an example embodiment, each of the base outer protrusion 201 and the base inner protrusion 202 may have cylindrical profiles (e.g., cylindrical cross sections). In other example embodiments, each of the base outer protrusion 201 and the base inner protrusion 202 may have other geometric profiles (e.g., triangular, rectangular, square, hexagonal, octagonal, etc.).

The base inner protrusion 202 includes a plurality of holes. In an example embodiment, the plurality of holes includes a first hole 211, a second hole 212, a third hole 213, and a fourth hole 214. The plurality of holes are configured to receive a first cord 231 and a second cord 232. In an example embodiment, the first hole 211 and the third hole 213 are configured to receive the first cord 231; the second hole 212 and the fourth hole 214 are configured to receive the second cord 232. In a related example embodiment, the first hole 211 is adjacent to the second hole 212 and the fourth hole 214 and the first hole is not adjacent to the third hole 213, such that the first cord 231 and the second cord 232 form a crossed configuration within the base inner protrusion 202. In an alternate example embodiment, the first hole 211 is adjacent to the third hole 213, and the second hole 212 is adjacent to the fourth hole 214, such that the first cord 231 and the second cord 232 form a parallel configuration within the base inner protrusion 202.

Each of the first cord 231 and the second cord 232 may be corded, braided, monofilament, etc. Likewise, each of the first cord 231 and the second cord 232 may be constructed of nylon, fabric, plastic, twine, metal, rubber, other elastic/inelastic material, etc. In a preferred example embodiment, each of the first cord 231 and the second cord 232 are constructed of paracord. In an example embodiment, the diameter of each of the first cord 231 and the second cord 232 falls in the range of 0.75 mm to 6 mm. In other example embodiments, different diameters of cordage outside the range of 0.75 mm to 6 mm may be utilized. In an example embodiment, each of the first cord 231 and the second cord 232 are elastic, such that they may stretch or deform in the direction along the length of the cord. In a different example embodiment, each of the first cord 231 and the second cord 232 are inelastic, such that they may not stretch or deform in the direction along the length of the cord.

FIG. 2B illustrates a front view of the cap portion 220. The cap portion 220 includes a cap outer protrusion 221. The cap outer protrusion 221 has a third height. The cap portion 220 further includes a cap inner protrusion 222. The cap inner protrusion 222 has a fourth height. In an example embodiment, the fourth height is less than the third height. In an example embodiment, each of the cap outer protrusion 221 and the cap inner protrusion 222 may have cylindrical profiles (e.g., cylindrical cross sections). In other example embodiments, each of the cap outer protrusion 221 and the cap inner protrusion 222 may have other geometric profiles (e.g., triangular, rectangular, square, hexagonal, octagonal, etc.).

When the cap portion 220 engages with the base portion 200, a number of pressures are applied to the first cord 231 and the second cord 232. For example, a first pressure is applied to the first cord 231 and the second cord 232 between the cap outer protrusion 221 and the base outer protrusion 201. The first pressure is further applied to the first cord 231 and the second cord 232 between the cap outer protrusion 221 and the base inner protrusion 202. Likewise, for example, a second pressure is applied to the first cord 231 and the second cord 232 by the cap inner protrusion 222.

In an example embodiment, each of the first pressure and the second pressure are configured to keep the first cord 231 and the second cord 232 from moving through their respective holes (e.g., first hole 211 and third hole 213 for first cord 231). Likewise, the orientation of the plurality of holes (e.g., crossed configuration) is further configured to keep the first cord 231 and the second cord 232 from inadvertently moving through their respective holes. For example, a crossed configuration makes it more difficult for the first cord 231 to unintentionally travel through the base portion 200 via its plurality of holes (e.g., first hole 211 and third hole 213).

In an example embodiment, an end of the first cord 231 and an end of the second cord 232 are attached to the cap portion 220 (e.g., attached to the back of the cap portion 220). For example, when the cap portion 220 does not engage with the base portion 200 (as discussed in greater detail below with reference to FIGS. 3A-3B), the cord lock 110 may remain a contained unit. This may help ensure that the cap portion 220 is not misplaced or lost. In a related example embodiment, the first cord 231 and the second cord 232 may be configured in a laced configuration outside of the base portion 200 (e.g., adjustable corset mechanism 104). In a related example embodiment, with a laced configuration, the first cord 231 and the second cord 232 are separate ends of the same cord (e.g., the laced cord) used on an adjustable corset mechanism 104. In an alternate example embodiment, an end of the first cord 231 and an end of the second cord 232 are attached to the base portion 200 (e.g., attached to the back of base portion 200).

Figure 3A:
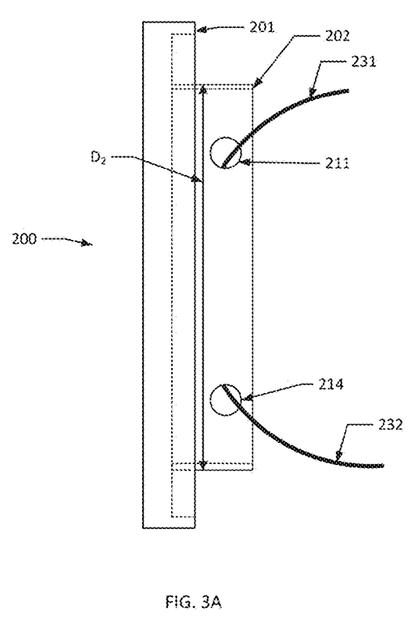
FIGS. 3A-3B illustrate a side view of the quick adjust cord lock including the base portion and the cap portion.
Figure 3B:
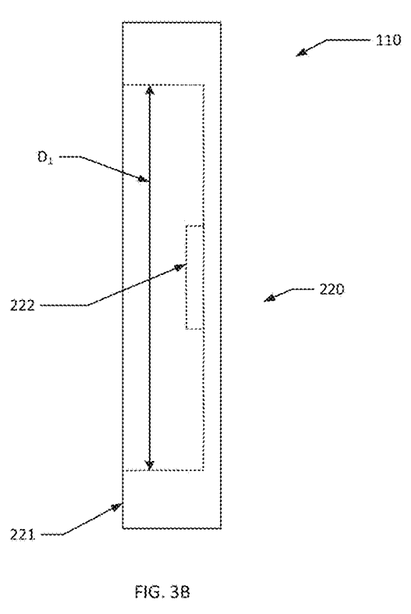

FIGS. 3A-3B illustrate a side view of the quick adjust cord lock including the base portion 200 and the cap portion 220. The cap portion 220 is configured to engage with the base portion 200. For example the inside diameter defined of the cap outer protrusion 221, noted as $D_1$ may be slightly larger (e.g., a fraction of a centimeter larger) than the outside diameter defined by the base inner protrusion 202, noted as $D_2$. In an example embodiment, the cap portion 220 engages with the base portion 200, such that the base inner protrusion 202 fits inside the cap outer protrusion 221. For example, the cap portion 220 engages with the base portion 200, such that the cap outer protrusion 221 fits concentrically around the base inner protrusion 202.

In an example embodiment, engagement between the cap portion 220 and the base portion 200 involves a lip and groove interface. For example, a lip may be a fully circumferential raised portion, a partially circumferential raised portion, a single bump or raised portion, a plurality of bumps or raised portions, etc. Also, for example, a groove may be any recess or indentation configured to interface with the lip as described above. In an example embodiment, the inside diameter of the cap outer protrusion 221 may include a groove; the outside diameter of the base inner protrusion 202 may include a lip, such that the lip of the base inner protrusion 202 interfaces with the groove of the cap outer protrusion 221 as the cap portion 220 engages with the base portion 200. In other example embodiments, the base inner protrusion 202 may include a groove and the cap outer protrusion 221 may include a lip, both the base inner protrusion 202 and the cap outer protrusion 221 may include both grooves and lips, etc.

Figure 4A:
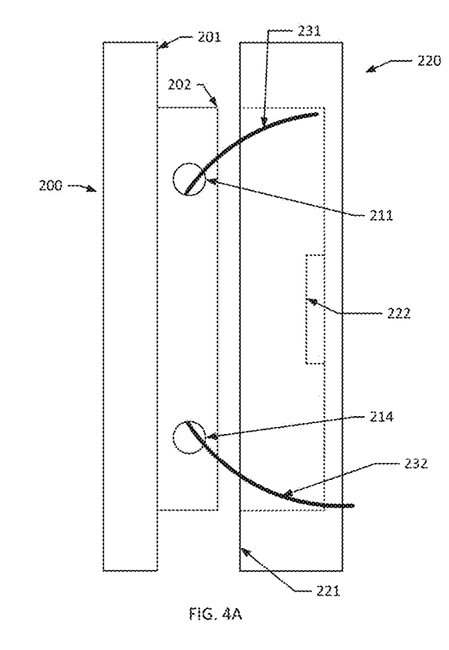
FIGS. 4A-4B illustrate a side view of the quick adjust cord lock including engagement between the base portion and the cap portion.
Figure 4B:
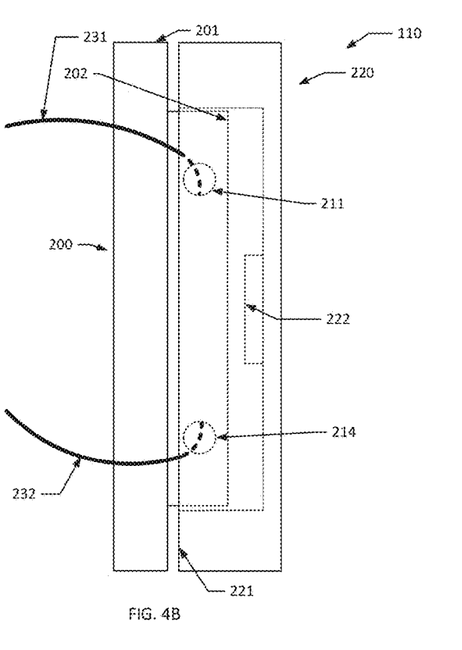

FIGS. 4A-4B illustrate a side view of the quick adjust cord lock including engagement between the base portion 200 and the cap portion 220. As illustrated in FIG. 4A, the cap portion 220, and more particularly the cap outer protrusion 221, is designed such that it may align concentrically with the base inner protrusion 202 of the base portion 220. The cap portion 220 may be physically engaged to the base portion 200 through an external force (e.g., a user pushing the cap portion 220 onto the base portion 200).

As illustrated in FIG. 4B, once the cap portion 220 engages with the base portion 200, the base inner protrusion 202 fits concentrically within the cap outer protrusion 221. Engagement may be enhanced by grooves and/or lips (as discussed above). Additionally, deformation of the first cord 231 and second cord 232 may further enhance engagement properties between the cap portion 220 and the base portion 200. For example, each of the first cord 231 and the second cord 232 are interfaced between the cap outer protrusion 221 and the base inner protrusion 220. When the cap portion 220 engages with the base portion 200, the first cord 231 and second cord 232 may deform and thus improve sealing between the cap outer protrusion 221 and the base inner protrusion 220.

Deformation and/or sealing of each of the first cord 231 and the second cord 232 further ensures that each of the first cord 231 and the second cord 232 do not move through their respective holes (e.g., first hole 211 and third hole 213 for first cord 231) at undesired times. For example, the first cord 231 and the second cord 232 may be locked in place. Locking of the cords is performed by a number of different pressures that are applied to the first cord 231 and the second cord 232. For example, the first pressure is applied to the first cord 231 and the second cord 232 between the cap outer protrusion 221 and the base outer protrusion 201. The first pressure is further applied to the first cord 231 and the second cord 232 between the cap outer protrusion 221 and the base inner protrusion 201. Likewise, for example, the second pressure is applied to the first cord 231 and the second cord 232 by the cap inner protrusion 221. When the cap portion 220 engages the base portion 200, the cap inner protrusion 221 pushes against the first cord 231 and the second cord 232. For example, the cap inner protrusion 221 may push against the crossed configuration of the first cord 231 and the second cord 232 (depicted by FIG. 2A) and deform and/or seal the first cord 231 and the second cord 232 at the crossed configuration.

Once the base portion 200 and the cap portion 220 engage one another, they may remain engaged until a user decides to adjust the cord lock 110. A method of adjusting cord lock 110 may include detaching the base portion 200 from the cap portion 220. For example, the user may pull the cap portion 220 off of the base portion 200. The user may initiate this pulling, for example, by sliding a finger nail between the base portion 200 and the cap portion 220. Pulling may further include gripping the base portion 200 (e.g., the base outer protrusion 201) and/or the cap portion 220 (e.g., cap outer protrusion 221).

The method of adjusting cord lock 110 may further include adjusting the first cord 231 and the second cord 232. For example, the user may pull an end of the first cord 231, such that a portion of the first cord 231 moves through the first hole 211 and the third hole 213 (not depicted). Also, for example, the user may pull an end of the second cord 231, such that a portion of the second cord 232 moves through the second hole 212 (not depicted) and the fourth hole 214. In an example embodiment, the pulling of the first cord 231 and the second cord 232 may happen simultaneously. For example, the end of the first cord and the send of the second cord may be fastened together (e.g., attached to the back of cap portion 220), such that by pulling (e.g., pulling the cap portion) both the end of the first cord 231 and the end of the second cord 232 are pulled simultaneously. By pulling the first cord 231 and the second cord 232, a user may adjust, for example, a laced configuration of an adjustable corset mechanism 104.

The method may further include reattaching the base portion 200 to the cap portion 220. For example, reattachment may include pushing the cap portion 220 onto the base portion 200, such that the cap portion 220 engages the base portion 200 and the cap outer protrusion 221 fits concentrically within the base inner protrusion 202.

Figures 5A, 5B:
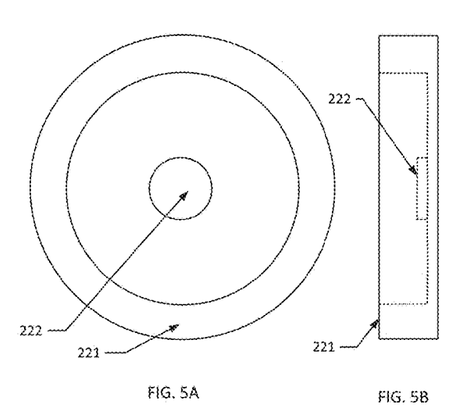
FIGS. 5A-C illustrate multiple views of an alternate embodiment of the cap portion.
Figure 5C:
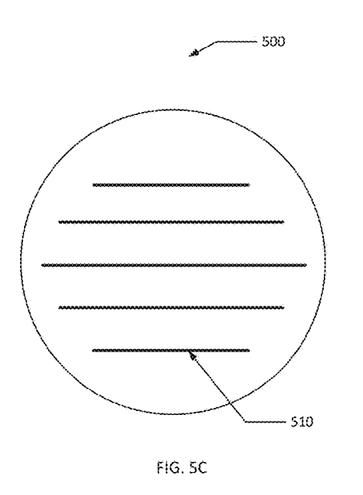

FIGS. 5A-C illustrate multiple views of an alternate embodiment of the cap portion. The alternate cap portion 500 includes a cap outer protrusion 221. The cap outer protrusion 221 has a third height. The cap portion 500 further includes a cap inner protrusion 222. The cap inner protrusion 222 has a fourth height. The cap portion 500 further includes a plurality of raised surfaces 510. For example, the plurality of raised surfaces 510 may enhance the ability of the user to grip the cap portion 500 during adjustment.

In an example embodiment, an end of the first cord 231 and an end of the second cord 232 are attached to the cap portion 500 (e.g., attached to the back of the cap portion 500). For example, when the cap portion 500 does not engage with the base portion 200 (as discussed above with reference to FIGS. 3A-3B), the cord lock 110 remains a contained unit.

Figure 6A:
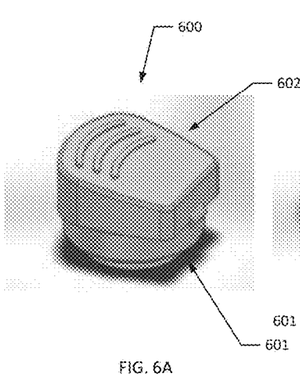
FIGS. 6A-C illustrate isometric views of the quick adjust cord lock including a hinged container.
Figure 6B:
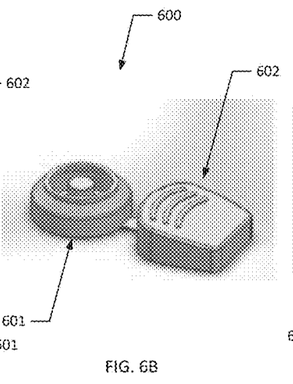
Figure 6C:
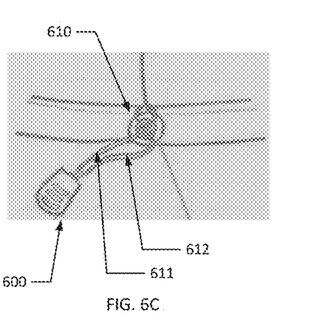

FIGS. 6A-C illustrate an example embodiment of the quick adjust cord lock including a hinged container. More particularly, FIG. 6A illustrates a hinged cap 600 in a hinged configuration. FIG. 6B illustrates the hinged cap 600 in an unhinged configuration. The hinged cap 600 includes a cap portion 601 and a container 602. The container 602 may be hinged to the back of the cap portion 601.

FIG. 6C illustrates use of the hinged cap 600 with other aspects of the adjustable cord lock 110. For example, the hinged cap 600 may interface with a base portion 610. Base portion 610, and particular interfacing between base portion 610 and hinged cap 600, is described above with reference to FIGS. 2A-4B. In an example embodiment, the hinged cap 600 is configured to store an excess portion (e.g., excess lengths) of the first cord 611 and the second cord 612. For example, excess portions of the first cord 611 and the second cord 612 may be stored in the container 602 of the hinged cap 600. The portions may be contained, by the hinged cap 600, when the hinged cap 600 is in a hinged configuration (as illustrated in FIG. 6A).

It should be understood that various changes and modifications to the presently preferred embodiments described herein will be apparent to those skilled in the art. Such changes and modifications can be made without departing from the spirit and scope of the present subject matter and The invention is claimed as follows:

1. A quick adjust cord lock comprising:
    a base portion, including:
        a base outer protrusion, and
        a base inner protrusion;
    a cap portion configured to mate with the base portion, including:
        a cap outer protrusion, and
        a cap inner protrusion;
    wherein the base inner protrusion has a plurality of holes configured to receive a first cord and a second cord, and
    wherein when the base portion is mated with the cap portion, a first pressure is applied to the first cord and the second cord between the cap outer protrusion and the base outer protrusion, and a second pressure is applied to the first cord and the second cord by the cap inner protrusion.

2. The quick adjust cord lock of claim 1, wherein the plurality of holes include a first hole, a second hole, a third hole, and a fourth hole, such that the first cord passes through the first hole and the third hole and the second cord passes through the second hole and the fourth hole.

3. The quick adjust cord lock of claim 2, wherein the first hole is adjacent to the second hole and the fourth hole, and wherein the first hole is not adjacent to the third hole, such that the first cord and the second cord form a crossed configuration within the base inner protrusion.

4. The quick adjust cord lock of claim 2, wherein the first hole is adjacent to the third hole, and wherein the second hole is adjacent to the fourth hole, such that the first cord and the second cord form a parallel configuration within the base inner protrusion.

5. The quick adjust cord lock of claim 1, wherein the cap portion engages with the base portion and the cap outer protrusion fits concentrically around the base inner protrusion.

6. The quick adjust cord lock of claim 1, wherein an end of the first cord and an end of the second cord are attached to the cap portion.

7. The quick adjust cord lock of claim 1, wherein the cap portion further includes a hinged container configured to store an excess portion of the first cord and the second cord.

8. The quick adjust cord lock of claim 1, wherein the cap portion includes a plurality of raised surfaces.

9. A cord lock comprising:
    a base portion, including:
        a base outer protrusion, and
        a base inner protrusion;
    a cap portion configured to mate with the base portion, including:
        a cap outer protrusion;
    wherein the base inner protrusion has a plurality of holes configured to receive a first cord;
    wherein when the base portion is mated with the cap portion, a first pressure is applied to the first cord between the cap outer protrusion and the base outer protrusion; and
    wherein the cap portion engages with the base portion and the cap outer protrusion fits concentrically around the base inner protrusion.

10. The cord lock of claim 9, wherein the plurality of holes include a first hole and a second hole, such that the first cord passes through the first hole and the second hole.

11. The cord lock of claim 9, wherein the plurality of holes include a first hole, a second hole, a third hole, and a fourth hole, such that the first cord passes through the first hole and the third hole and a second cord passes through the second hole and the fourth hole.

12. The quick adjust cord lock of claim 11, wherein the first hole is adjacent to the second hole and the fourth hole, and wherein the first hole is not adjacent to the third hole, such that the first cord and the second cord form a crossed configuration within the base inner protrusion.

13. The quick adjust cord lock of claim 11, wherein the first hole is adjacent to the third hole, and wherein the second hole is adjacent to the fourth hole, such that the first cord and the second cord form a parallel configuration within the base inner protrusion.

14. The cord lock of claim 9, wherein the cap portion further includes a hinged container configured to store an excess portion of the first cord.

15. The cord lock of claim 9, wherein the cap portion further includes a plurality of raised surfaces.

16. A method of adjusting a quick adjust cord lock including:
    detaching a base portion from a cap portion,
        wherein the base portion includes:
            a base outer protrusion, and
            a base inner protrusion,
        wherein the top portion includes:
            a cap outer protrusion, and
            a cap inner protrusion, and
        wherein the base inner protrusion has a first hole and a second hole to receive a first cord and a third hole and a fourth hole to receive a second cord;
    adjusting a first cord and a second cord, including:
        pulling an end of the first cord, such that a portion of the first cord moves through the first hole and a second hole, and
        pulling an end of the second cord, such that a portion of the second cord moves through the third hole and the fourth hole; and
    reattaching the base portion to the cap portion, including:
        pushing the cap portion onto the base portion, such that the cap portion mates with the base portion and the cap outer protrusion fits concentrically around the base inner protrusion.

17. The method of claim 16, wherein the end of the first cord and the end of the second cord are attached to the cap portion.

18. The method of claim 16, wherein a first pressure is applied to the first cord and the second cord between the cap outer protrusion and the base outer protrusion.

19. The method of claim 16, wherein a second pressure is applied to the first cord and the second cord by the cap inner protrusion.

* * * * *